United States Patent [19]
Blakely

[11] Patent Number: 5,761,018
[45] Date of Patent: Jun. 2, 1998

[54] VARIABLE THERMAL MODEL OVERLOAD IN ELECTRICAL SWITCHING APPARATUS

[75] Inventor: John H. Blakely, Asheville, N.C.

[73] Assignee: Eaton Corporation, Cleveland, Ohio

[21] Appl. No.: 759,908

[22] Filed: Dec. 4, 1996

[51] Int. Cl.$^6$ .................................................. H02H 5/00
[52] U.S. Cl. .......................... 361/23; 361/24; 361/103; 361/115; 318/430
[58] Field of Search .............................. 361/23, 24, 25, 361/103, 115; 318/430

[56] References Cited

U.S. PATENT DOCUMENTS

| | | | |
|---|---|---|---|
| 4,528,539 | 7/1985 | Forsell et al. | 337/49 |
| 4,547,826 | 10/1985 | Premerlani | 361/25 |
| 4,760,364 | 7/1988 | Ostby | 335/132 |
| 4,766,273 | 8/1988 | Butterworth et al. | 200/147 R |
| 5,222,009 | 6/1993 | Scharnick et al. | 361/28 |

Primary Examiner—Jeffrey A. Gaffin
Assistant Examiner—Stephen Jackson
Attorney, Agent, or Firm—Larry G. Vandezande

[57] ABSTRACT

A motor starter for an electrical circuit includes separable contacts for switching an electrical current flowing between a power source and a motor; an operating mechanism responsive to a trip signal for opening and closing the separable contacts; a separable contact state detection circuit providing an operating signal having two states corresponding to the open and closed positions of the separable contacts; a current transformer sensing the electrical current flowing between the power source and the motor and providing a sensed current value; and an overload relay generating the trip signal as an $I^2t$ function of the sensed current value and the two states of the operating signal. The overload relay employs a pair of thermal time constants which closely model the motor under both natural convection and forced air cooling conditions.

15 Claims, 6 Drawing Sheets

VARIABLE THERMAL MODEL OVERLOAD IN ELECTRICAL SWITCHING APPARATUS

BACKGROUND OF THE INVENTION

1. Field of the Invention

This invention relates to a load protection circuit in an electrical switching apparatus and, more particularly, to an overload relay, for a load such as a motor, used in motor starters, motor controllers, and other load controllers.

2. Background Information

Electrical switching devices include, for example, circuit switching devices and circuit interrupters such as contactors, motor starters, motor controllers, lighting controllers, other load controllers, circuit breakers and other electromechanical switching devices used for controlling a variety of electrical loads. Electromagnetic contactors, for example, include a plurality of movable electrical contacts which are brought into contact with a plurality of fixed electrical contacts to close the contactor. The movable electrical contacts are separated from the fixed contacts to open the contactor. Examples of contactors are disclosed in U.S. Pat. Nos. 4,760,364; and 4,766,273.

A common type of starter for loads such as motors, lighting, and the like, comprises an electromagnetic contactor with an overload relay. In a motor starter, for example, the purpose of the overload relay is to estimate the heat produced in the motor by line current and "trip" or stop the motor if the retained heat exceeds an acceptable level. The overload relay monitors the load current and trips the contactor open if a persistent overcurrent condition exists. Typically, the overload relay tracks an $I^2t$ characteristic of the load current which is a measure of heating. An example of an overload relay is disclosed in U.S. Pat. No. 4,528,539.

Today, it is common for the overload relay to contain a microprocessor which digitally generates the $I^2t$ characteristic. An example of an overload relay incorporating a microprocessor is disclosed in U.S. Pat. No. 5,222,009.

Typically, in overload relays employing the $I^2t$ characteristic, an $I^2t$ value is calculated from a sensed load current value I for a fixed time t. If the calculated $I^2t$ value is less than an accumulated $I^2t$ value, then the accumulated $I^2t$ value is updated by subtracting a cooling adjustment, which reflects cooling of the load, from the previously calculated accumulated $I^2t$ value. On the other hand, if the calculated $I^2t$ value is greater than or equal to the accumulated $I^2t$ value, then the accumulated $I^2t$ value is updated by adding a heating adjustment, which reflects heating of the load, to the previously calculated accumulated $I^2t$ value. When the accumulated $I^2t$ value reaches a trip level, the contactor is tripped open to interrupt the flow of current to the load.

For example, in the case where the load is a motor, cooling of the motor is different depending upon whether the motor is either running/spinning or stopped/stalled. The thermal model for a spinning motor, having a fan on the motor shaft for forced air cooling, is different from the thermal model for a stalled non-spinning motor which is cooled by natural convection.

In motors, during startup, there is a relatively high startup current, which is typically many times rated motor current, until the motor reaches a constant speed. This high startup current must be permitted by the overload relay in order to start the motor. On the other hand, after startup, a relatively high current may cause thermal damage to the motor and, hence, appropriate protection of the motor is essential to its reliable operation. If the motor stalls and the actual motor current exceeds the rated motor current for a period of time, then power must be removed from the motor to obviate thermal damage.

For example, in an analog or digital thermal protection circuit of an overload relay, the thermal characteristic is modeled by a single thermal mass term associated with integration of heat of the load, and a single dissipation term associated with cooling of the load. The thermal mass term and the dissipation term combine to form a thermal time constant. In the analog model of the thermal characteristic, for example, the thermal mass may be represented electrically with a capacitor and the thermal dissipation or cooling term may be represented electrically with a resistor shunting the capacitor. Heat input to the load is analogous to a current source. Temperature rise is represented by the voltage developed across the capacitor as charged by current from the current source. In other words, the "heat input" from the current source less the "cooling" by the resistor is integrated by the capacitor.

The overload relay provides optimum protection for a spinning motor. The relatively fast thermal time constant for the spinning motor, when applied to a non-energized motor, allows a user to restart the motor before it has adequately cooled. In the event there are a plurality of motor restarts, the motor temperature may "ratchet" to the point of thermal failure. Hence, there is room for improvement.

SUMMARY OF THE INVENTION

This invention solves this problem by changing a thermal time constant when the separable contacts of an electric switching device are open. For example, in the case of a motor starter having an overload relay, the thermal time constant changes when the motor is not running. Two thermal time constants closely model the motor under both forced air cooling and natural convection conditions. This prevents a user from "ratcheting" up the motor temperature and, also, allows the overload relay to safely provide more starting thermal capacity while still protecting the motor at all times.

In one aspect of the invention, a motor starter for an electrical circuit includes separable contact means for switching an electrical current flowing between a power source and a load; operating means responsive to a trip signal for opening and closing the separable contact means; means for providing an operating signal having a first state when the separable contact means is open and a second state when the separable contact means is closed; means for sensing the electrical current flowing between the power source and the load and providing a sensed current value therefrom; and overload relay means for generating the trip signal as a function of the sensed current value and the two states of the operating signal.

In another aspect of the invention, a motor starter for an electrical circuit includes electrical contactor means including separable contact means for switching an electrical current flowing between a power source and a load, and operating means responsive to a trip signal for opening and closing the separable contact means; means for providing an operating signal having a first state when the separable contact means is open and a second state when the separable contact means is closed; means for sensing the electrical current flowing between the power source and the load and providing a sensed current value therefrom; and overload relay means for generating the trip signal as a function of the sensed current value and the two states of the operating signal.

In a further aspect of the invention, an electrical switching apparatus for an electrical circuit includes separable contact means having a closed position and an open position for switching an electrical current flowing between a power source and a load; means responsive to a trip signal for moving the separable contact means from the closed position to the open position; means for providing an operating signal having a first state when the separable contact means is open and a second state when the separable contact means is closed; means for sensing the electrical current flowing between the power source and the load and providing a sensed current value therefrom; and means for generating the trip signal as a function of the sensed current value and the two states of the operating signal.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "signal" shall expressly include, but not be limited to any input or output utilized for control and/or monitoring such as, for example, analog signals, digital signals, command signals, status signals, discrete signals, serial signals or serial messages.

The invention has particular application and will be described in connection with a motor starter and, more particularly, a motor starter including an overload relay protection circuit and three-phase contactor contacts. However, it will be realized by those skilled in the art that the invention has broad application for controlling one or more contacts in electrical switching devices, such as circuit switching devices and circuit interrupters including circuit breakers, contactors, motor controllers, lighting controllers and other load controllers, utilized in other applications.

Figure 1:
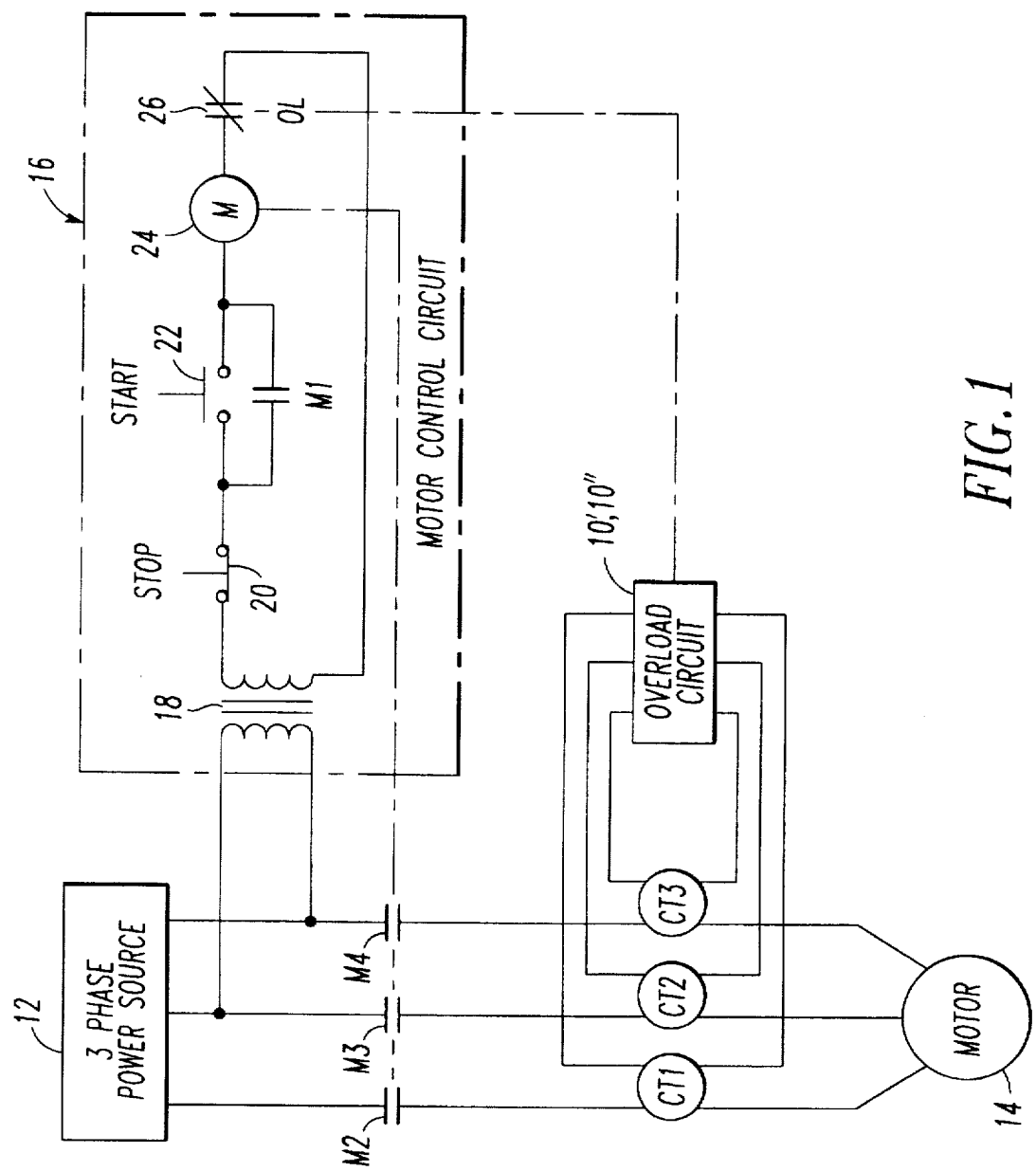
FIG. 1 is a block diagram of a three-phase motor and motor control circuit including an overload relay protection circuit in accordance with the invention.

A three-phase power and control system is shown in FIG. 1. The system includes an overload relay protection circuit 10' incorporating the features of the invention. An overload relay protection circuit 10, similar to the circuit 10', and reference numbers 12 through 62 employed herein are disclosed in U.S. Pat. No. 5,222,009, which is hereby incorporated by reference. A three-phase power source 12 is coupled through contactor contacts M2,M3,M4 and sensors, such as respective current transformers CT1,CT2,CT3, to a three-phase motor 14 in typical manner. Either external or internal current transformers may be used. A single-phase start and control circuit 16 is used to control the supply of power to the motor 14. Generally, a step down transformer 18 is used to reduce the power (typically 208–600 volts AC) from two phases of the power source 12 to 120 volts AC. A normally closed STOP button 20 is provided to break the circuit and manually shut off the power supply to the motor 14. To start up, the normally open START button 22 is closed, energizing the coil (M) 24 and closing contacts M1,M2,M3,M4. Contact M1 interlocks the control circuit 16 in order that contacts M2,M3,M4 stay energized unless the control circuit 16 is opened at the STOP button 20 or is opened by the opening of the normally closed overload relay contact (OL) 26.

The overload relay circuit 10' of the invention is connected to the secondaries of the three current transformers CT1,CT2,CT3 for monitoring or sensing the electrical load current flowing between the power source 12 and the motor 14, to provide sensed current values therefrom, and to detect the presence of an overload condition. When a predetermined overload condition is present, the overload relay circuit 10' is activated to open the contact 26 and shut down the power supply to the motor 14. After certain events have occurred, the contact 26 will reclose to permit starting the motor 14.

Figure 2:
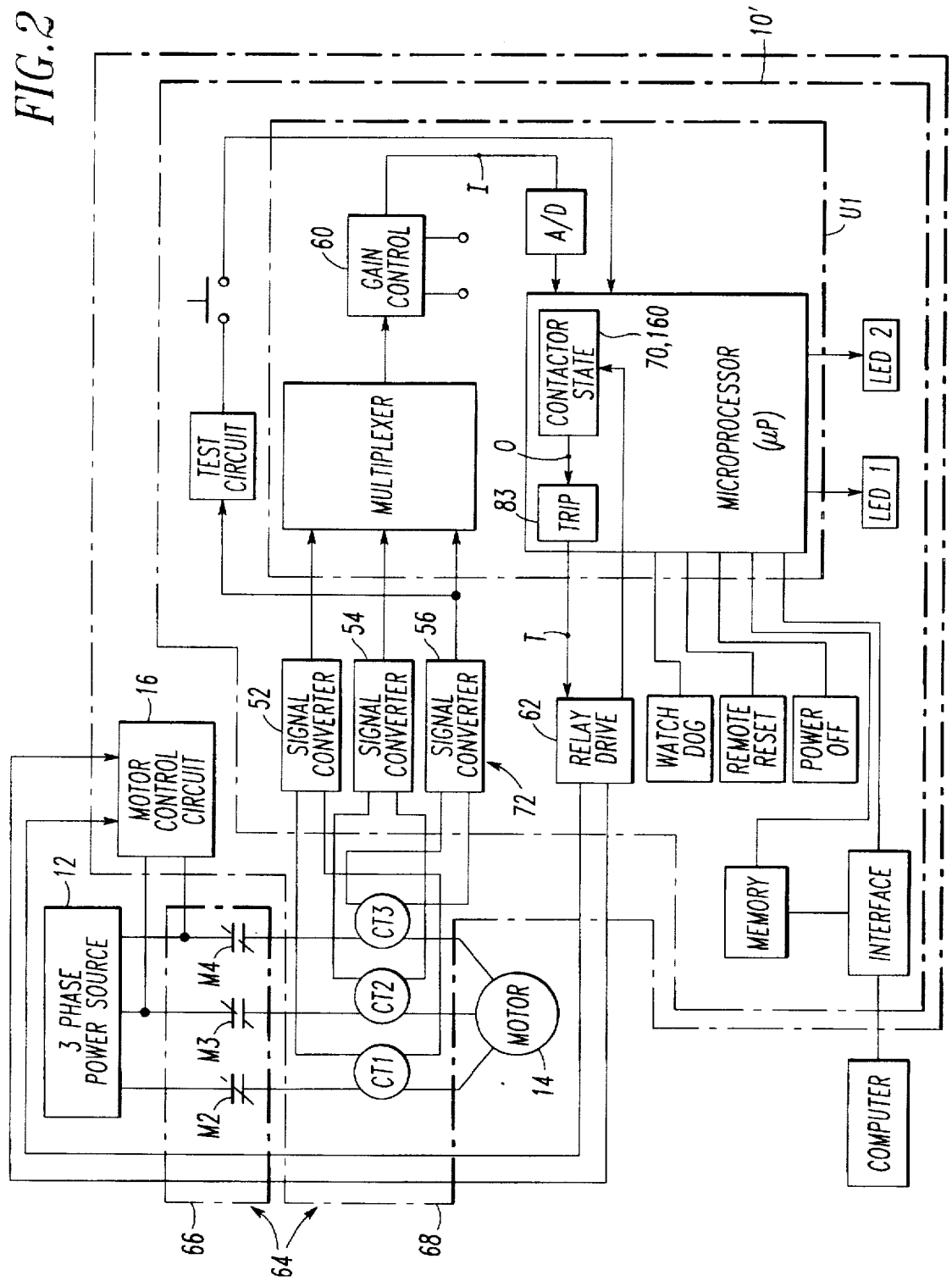
FIG. 2 is a functional block diagram of an embodiment of the overload relay protection circuit of FIG. 1.

An expanded functional block diagram of the overload relay circuit 10' is shown in FIG. 2. Signal converters 52,54,56 are provided and are coupled to the current transformers CT1,CT2,CT3, respectively. The converters 52,54, 56 convert the current at each phase of the motor 14 into a suitable filtered (AC) signal for input to the multiplexer of integrated circuit U1. The multiplexer continuously sequentially scans the outputs of the converters 52,54,56 to monitor the load level on each of the three phases of the windings (not shown) of the motor 14. This permits monitoring of each of the three power phases. The three monitored signals produced by the converters 52,54,56 are input to the multiplexer where they are combined to produce a single output which preserves the independent identity of each of the three inputs. This combined signal is input to a gain control circuit 60 where the current gain range can be set in accordance with the load specifications for each particular motor 14. The analog output I of the gain control circuit 60 is presented to the microprocessor (μP) through the analog-to-digital (A/D) converter of integrated circuit U1.

If the overload condition is present for the defined period of time, the trip sequence is initiated, and the trip signal T is output by the microprocessor of integrated circuit U1 to a relay drive circuit 62. The relay drive circuit 62 is coupled directly to the overload contact 26 of FIG. 1. When the trip signal T is present, the normally closed contact 26 is opened, the coil 24 is deenergized, and the motor 14 is shut down. Other embodiments of the relay drive circuit 62 and overload contact 26 are discussed below in connection with FIGS. 5 and 6.

In the exemplary embodiment of FIG. 2, a motor starter 64 includes an electrical contactor 66 having the separable contacts M2,M3,M4 for switching an electrical current flowing between the power source 12 and the motor 14, and an overload relay 68. The coil 24 (shown in FIG. 1) of the motor control circuit 16 forms an operating circuit which is responsive to the two states of the trip signal T of the overload relay circuit 10' for moving the separable contacts M2,M3,M4 between the closed position of FIG. 2 and the open position of FIG. 1, thereby opening and closing such separable contacts.

As an important aspect of the invention, the motor starter 64 of FIG. 2 includes a contactor state routine 70 or 160 which provides, as explained in greater detail below in connection with FIG. 5 and FIGS. 6–7, respectively, an operating signal O having a first state when the separable contacts M2,M3,M4 are open and a second state when such separable contacts are closed.

As explained in greater detail below in connection with FIGS. 3 and 4, the respective overload relay circuits 10" and 10' generate the trip signal T as an $I^2t$ function of the sensed current value I and time t, and the two states of the operating signal O. In the embodiment of FIGS. 2 and 4, the overload relay circuit 10' is implemented with a digital circuit employing a processor such as the microcontroller or microprocessor. Alternatively, an analog circuit 10" may be employed as shown in FIG. 3.

Figure 3:
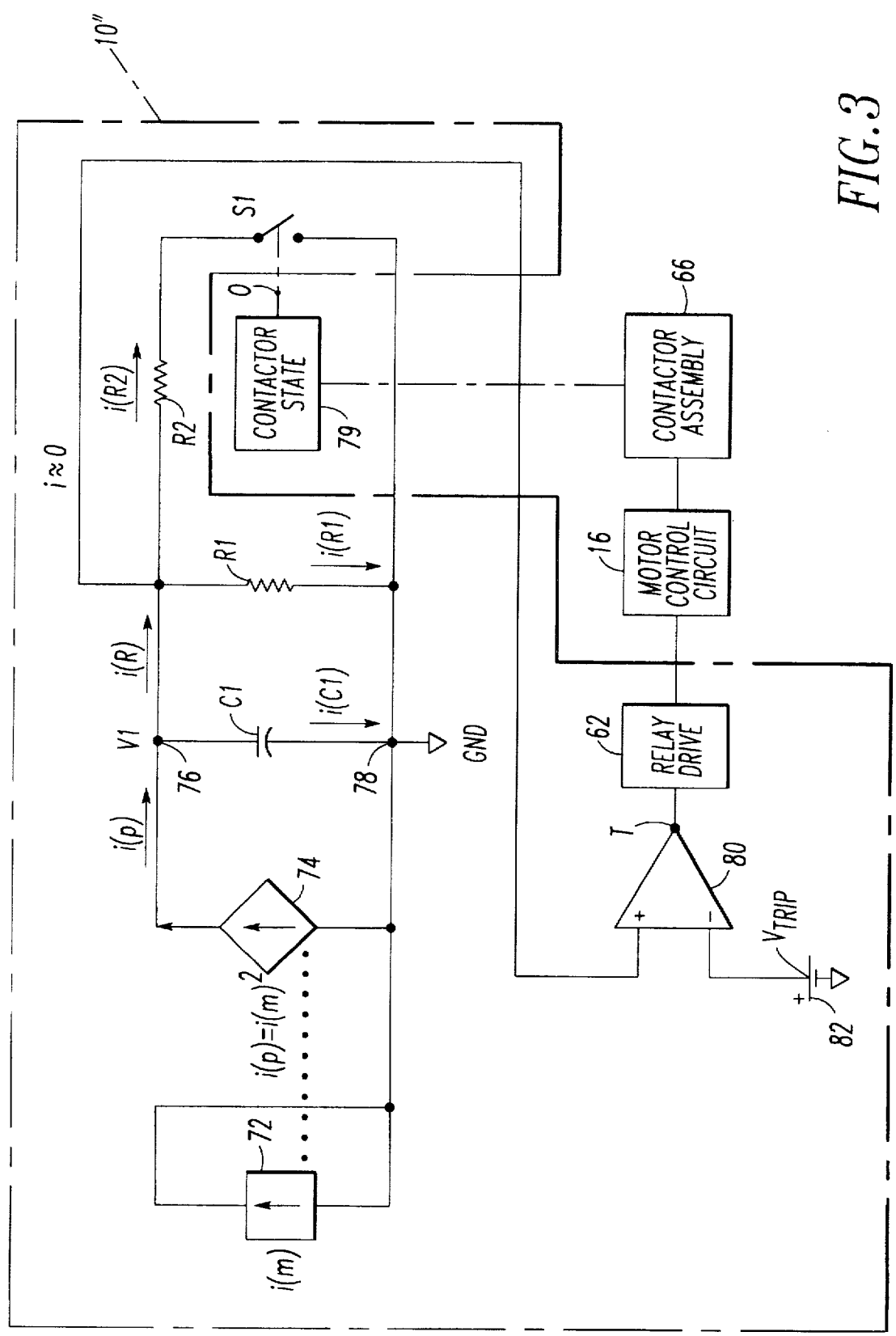
FIG. 3 is a schematic circuit diagram partially in block diagram form of another embodiment of an overload relay protection circuit in accordance with the invention.
Figure 4:
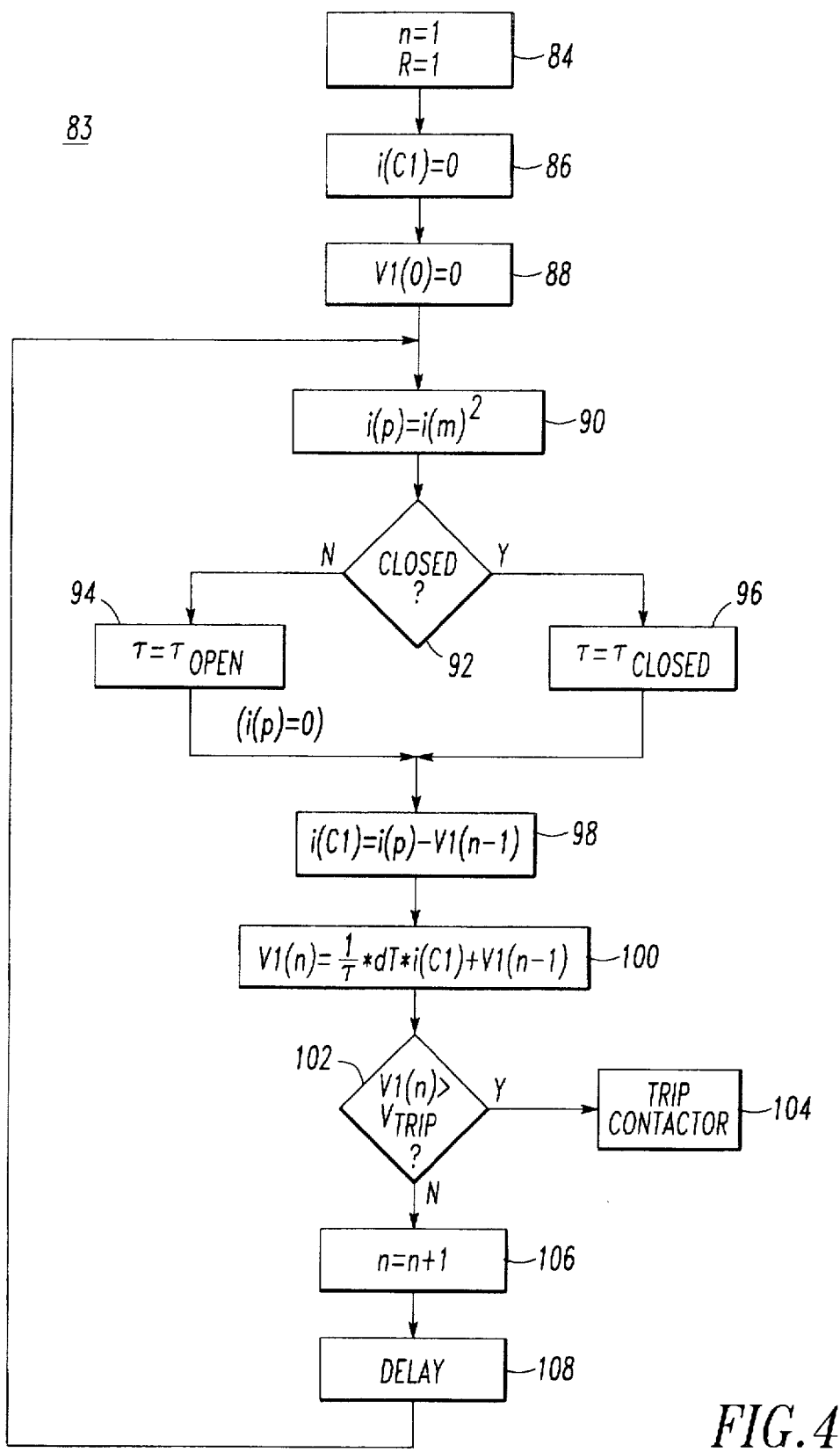
FIG. 4 is a flowchart of a routine used in the implementation of the embodiment of FIG. 2.

Referring to FIG. 3, the overload relay protection analog circuit 10" embodiment is illustrated, although the invention is applicable to a variety of different embodiments such as the processor-based digital circuit 10' embodiment of FIG. 2. A sensed analog current value i(m) (i.e., I) is suitably derived from one or more current sensors 72 such as the current transformers CT1,CT2,CT3 of FIG. 1. A squaring circuit 74 provides an analog squared current value i(p) from the square of the analog sensed current value i(m). A thermal mass is represented by a capacitor C1 and a dissipation term is represented by resistors R1,R2. The capacitor C1 is charged by the analog squared current value i(p) which divides into analog capacitor current i(C1) in capacitor C1 and analog resistor current i(R) in one or both of resistors R1,R2. The capacitor C1 is charged by the analog capacitor current i(C1) to form an analog thermal protection voltage V1 at node 76 as referenced to ground GND at node 78.

The series combination of the resistor R2 and switch S1 is in parallel with the resistor R1. The capacitor C1 is discharged by the analog resistor current i(R) which includes the analog currents i(R1),i(R2) of the respective resistors R1,R2. The switch S1 is controlled by the operating signal O from a contactor state circuit 79 which reflects the state of the contactor 66. When the separable contacts M2,M3,M4 (shown in FIG. 1) of the contactor 66 are open (closed), the switch S1 is open (closed).

To accomplish the change of time constant, the net resistance in parallel with capacitor C1 is changed by the switch S1. When the separable contacts of the contactor 66 are closed, in response to the second state of the circuit 79, the switch S1 switches the second resistor R2 in parallel with the first resistor R1. When the contactor 66 is closed, the thermal time constant is determined by C1(R1||R2) which is set to the forced air time constant. When the contactor 66 opens, S1 opens and the new thermal time constant is determined by C1(R1). This time constant is longer than the first time constant since the resistance of R1 is greater than the resistance of R1 in parallel with the resistance of R2.

A comparator 80 compares the analog thermal protection voltage V1 at node 76 with an analog predetermined reference voltage $V_{TRIP}$ from a voltage reference 82. In the exemplary embodiment, the comparator 80 generates the trip signal T when the analog thermal protection voltage V1 is about greater than the analog predetermined reference voltage $V_{TRIP}$.

FIG. 4 is a flowchart of a suitable overload relay routine 83 used by the microprocessor of integrated circuit U1 to trip the separable contacts M2,M3,M4 of FIG. 2. In the digital circuit 10', as implemented by such microprocessor, software controls the thermal model, which mimics the analog thermal model of FIG. 3. In the routine 83, the thermal mass (i.e., capacitor C1) is represented by an integration term. The digital values employed in FIG. 4 are analogous to the analog values of FIG. 3 and, hence, similar labels are employed for the analog values of FIG. 3 and the digital values of FIG. 4. Also, for convenience of solution by the microprocessor, in FIG. 4, the digital value of the equivalent resistor R formed by the parallel combination of resistors R1,R2 of FIG. 3 is preferably set to one ohm. In this manner, using the well-known equation V=IR, the current in the equivalent resistor R may be readily obtained from the voltage across such equivalent resistor.

At steps 84; 86; and 88, an integer n and the value of the equivalent resistor R; a digital value i(C1); and a digital thermal protection value V1(0) at time 0 (i.e., 0=n−1), are respectively initialized to one, zero, and zero. At step 90, a digital squared value i(p) is obtained by squaring the digital sensed current value i(m) (i.e., I) which is suitably derived from the current transformers CT1,CT2,CT3 of FIG. 2. Next, at step 92, the operating signal O from the routines 70,160 is tested and, if false, a time constant τ is set as follows:

$$\tau = \tau_{OPEN} = R1 * C1 \qquad \text{Eq. (1)}$$

at step 94. The digital squared value i(p) may be assumed to be zero when the separable contacts M2,M3,M4 are open and the operating signal O is false. Otherwise, if true, the time constant τ is set as follows:

$$\tau = \tau_{CLOSED} = R * C1 = C1 \qquad \text{Eq. (2)}$$

at step 96. Then, at step 98, the digital value i(C1) is set equal to the digital squared value i(p) less the previously calculated digital thermal protection value V1(n−1) or V1(0) in this first (n=1) iteration. In the closed state of the separable contacts, the resulting digital value i(C1) of step 98 is set equal to the digital squared value i(p) less the digital value i(R) (i.e., i(p)−V1(n−1)/R or i(p)−V1(n−1) with R=1). On the other hand, in the open state, the resulting digital value i(C1) of step 98 is set equal to digital squared value i(p) (i.e., 0) less digital value V1(n−1) (i.e., i(C1)=−V1(n−1)). This result of step 98, for the open state, must be divided (in step 100) by R1 to produce the actual value of i(C1). This adjustment, for the open state, is explained below in connection with step 100, although no adjustment is needed for the closed state.

At step 100, a newly calculated digital thermal protection value V1(n) is set equal to the previously calculated digital thermal protection value V1(n−1) plus the digital value i(C1) of step 98 times a loop time dT divided by the time constant τ of steps 94,96. The digital thermal protection value V1(n) is calculated according to Equation 3:

$$V1(n) = dV1(n) + V1(n-1) = \left( \frac{dT}{\tau} * i(C1) \right) + V1(n-1) \qquad \text{Eq. (3)}$$

wherein:

$$dV1(n) = V1(n) - V1(n-1) = \Delta V1$$

Step 100, hence, changes the digital thermal protection value V1 as a function of a first time constant $\tau_{OPEN}$ (i.e., R1*C1), in the event of the first (i.e., open) state of the operating signal O, and alternatively changes the digital thermal protection value V1 as a function of a second time constant $\tau_{CLOSED}$ (i.e., C1), in the event of the second (i.e., closed) state of the operating signal O.

In the closed state, step 98 produces the correct value of the digital value i(C1). In turn, step 100 produces the correct value dV1(n) by employing $\tau_{CLOSED}$=C1 from step 96. On the other hand, in the open state, step 98 produces a value (i.e., the actual value of i(C1) times R1) which is proportional (by the factor R1) to the correct value of the digital value i(C1). In turn, step 100 produces the correct value dV1(n) by employing $\tau_{OPEN}$=C1*R1 from step 94. Hence, for the open state, the value proportional to i(C1) produced at step 98 is adjusted by the value of $\tau$ from step 94.

In the exemplary embodiment, for the closed state, with the parallel combination of resistors R1,R2 set to one ohm, the current in the equivalent resistor R is readily obtained from the voltage across such equivalent resistor in step 98. Furthermore, for the open state, because the digital squared value i(p) may be assumed to be zero, the same steps 98,100 may be employed by proper selection of the value of $\tau$ at steps 94,96. Although exemplary steps 92,94,96,98 are illustrated, it will be appreciated that a wide variety of methods may be employed to calculate the digital thermal protection value V1(n).

At step 102, the newly calculated digital thermal protection value V1(n) is compared with a digital predetermined trip value $V_{TRIP}$. If the newly calculated digital thermal protection value V1(n) is greater than the digital predetermined trip value $V_{TRIP}$, then, at step 104, the contactor 66 is opened by setting the trip signal T of FIG. 2 to the appropriate state. Otherwise, at step 106, the contactor 66 remains closed and the integer n is incremented. After a suitable delay, at step 108, the routine repeats at step 90. The subsequent iteration of steps 90,92,94,96,98,100 calculates the next digital thermal protection value V1(n+1). For purposes of illustration, but not of limitation, in the exemplary embodiment, the execution time of the loop formed by steps 90 through 108 is about 1 mS, $\tau_{CLOSED}$ is about 494 S, and $\tau_{OPEN}$ is about 2913 S, although the invention is applicable to a wide range of such times.

In the analog and digital solutions of respective FIGS. 3 and 4, the resistor or thermal dissipation term is typically represented by a proportional term. Although various implementation methods are possible, the ultimate solution revolves around this basic model in which the effective thermal time constant $\tau$ is changed based on the present state of the contactor 66.

The exemplary overload relay 64 of FIG. 2 changes its thermal time constant based on whether the associated contactor 66 is open or closed. In other words, the thermal time constant reflects the operating or stopped condition of the motor 14. When the contactor 66 is closed, the thermal time constant $\tau$ is equivalent to the forced air time constant of the motor 14. On the other hand, when open, the thermal time constant $\tau$ is equivalent to the natural convection time constant of the motor 14.

Figure 5:
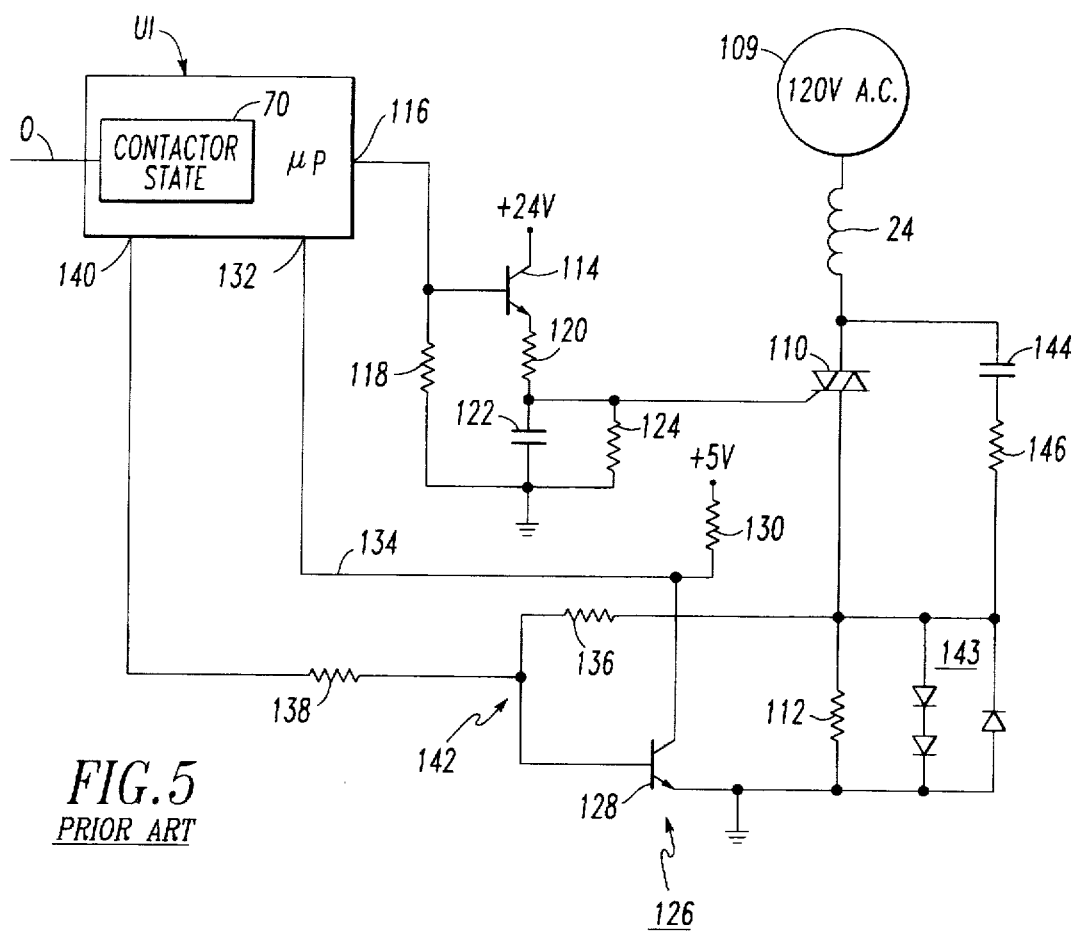
FIG. 5 is a schematic circuit diagram partially in block diagram form of an embodiment of a contactor state detection circuit used in connection with an AC controlled coil.

FIG. 5 illustrates application of the invention to those units wherein the contactor coil 24 of FIG. 1 is energized by an AC voltage source 109. The coil 24 is connected to the exemplary 120 volt AC source 109 through a triac 110 and a current sensing resistor 112. The triac 110 is turned on by a transistor 114 connected to the gate of such triac. The transistor 114 in turn is controlled by output 116 of the microprocessor of integrated circuit U1 which applies base drive current to the transistor 114. A pull down resistor 118 prevents turn on of the transistor 114 when the microprocessor is powering up. A resistor 120 limits current through the transistor 114 while a capacitor 122 protects the gate of the triac 110 from transients. A resistor 124 provides a discharge path for the capacitor 122.

An indication of the amplitude of the current of the coil 24 is fed back to the microprocessor of integrated circuit U1 by a feedback circuit 126 including transistor 128 having its base bias determined by the current sensing resistor 112. A pull up resistor 130 applies a 5 volt signal to input 132 of the microprocessor over lead 134 when transistor 128 is turned off. With the transistor 128 turned on, the input 132 to the microprocessor goes low. Of course, during the negative half cycles of the AC voltage applied to the coil 24, the transistor 128 is biased off. During the positive half cycles, the bias is such that transistor 128 is turned on for the entire positive half cycle when the contactor armature (not shown) is separated from the contactor core (not shown), and therefore, the inductance is low, and is turned on only about one-half of the positive half cycle when the armature is seated and the inductance is high. Thus, the signal on lead 134 applied to the microprocessor has a 50% duty cycle when the separable contacts M2,M3,M4 of FIG. 1 are open, and about a 25% duty cycle when such separable contacts are closed. The change in inductance of the coil 24 from when it is seated and the separable contacts are closed to when it is separated from the core and such contacts are open is much greater than the effects of temperature on the resistance of the coil 24. It is also much greater than any effects of temperature on the junctions of the transistor 128, so that a 50% duty cycle on the signal applied by the transistor 128 to the microprocessor is an indication that the separable contacts are open, or that the armature is not fully seated and therefore the contact pressure is not what it should be. Also then, a 25% duty cycle on the current feedback signal is an indication that the armature is fully seated and that therefore the separable contacts are closed with adequate pressure.

The voltage across the current sensing resistor 112 is applied to the base of transistor 128 through a resistor 136. A second resistor 138 is also connected to the base of transistor 128 and to an output 140 of the microprocessor of integrated circuit U1. When the output 140 is set to a low impedance, the resistor 138 forms a voltage divider 142 with the resistor 136 to adjust the duty cycle of the signal generated by the transistor 128. When the impedance of output 140 is high, the base drive on transistor 128 is unaffected by resistor 138. This feature by which the bias on transistor 128 is made selectable allows for different coils or can be used for temperature adjustment.

The configuration of FIG. 5 also permits additional diagnostics to be performed. If the microprocessor of integrated circuit U1 turns off the transistor 114, yet the feedback signal still indicates current flow through the coil 24, this is an indication that the triac 110 has failed. Furthermore, if the triac 110 is turned off and there is no current feedback signal, but the current transformers CT1,CT2,CT3 sense current flowing through the main conductors to the motor 14 of FIG. 1, this is an indication that the separable contacts M2,M3, M4 are welded closed. The diodes 143 protect the transistor 128 from excessive currents as well as limiting the power in current sensing resistor 112. A conventional snubber formed by the capacitor 144 and resistor 146 protects the triac 110.

Figure 6:
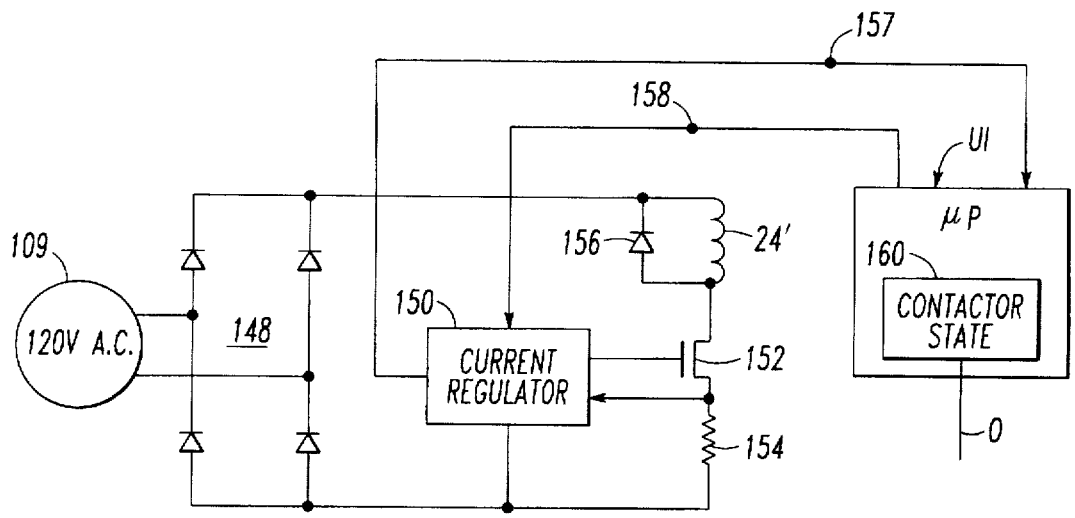
FIG. 6 is a schematic circuit diagram partially in block diagram form of another embodiment of the contactor state detection circuit incorporating a DC controlled coil.

FIG. 6 illustrates application of the invention to a switch in which the coil 24 is replaced by a DC coil 24'. DC power for the coil 24' is derived from the exemplary 120 volt AC voltage source 109 by a diode bridge 148. A current regulator 150 controls the DC current flowing through the coil 24' through a FET 152. The current sensing resistor 154 provides a current feedback signal to the current regulator 150. A relatively large closing current is applied to the coil 24' to initiate movement of the armature and closure of the separable contacts M2,M3,M4 of FIG. 1. When such separable contacts are closed, a reduced holding current is applied to the coil 24'. The current through resistor 154 can be input to the current regulator 150 by a circuit similar to that shown in FIG. 5 for the AC coil 24 to indicate whether the current is above or below the selectable threshold.

As the current through the DC coil 24' is set by the current regulator 150, and not the inherent coil inductance as in the case of the AC energized coil 24, a different technique is utilized to determine the inductance of the coil 24' and, therefore, the position of the separable contacts M2,M3,M4. As is conventional, the DC coil 24' is shunted by a fly-back diode 156. The current regulator 150 controls the current to the coil 24' by gating portions of the DC pulses output by the bridge 148 to the coil 24'. In the exemplary embodiment, the current regulator 150 regulates the duty cycle of the FET 152 at a frequency substantially higher than the frequency (e.g., 60 Hz) of the supply voltage. The duty cycle provided during holding is sufficient to provide about twice the current needed to keep the separable contacts closed. When a determination is to be made as to the position of such contacts, the microprocessor of integrated circuit U1 reads from lead 157 the coil current as indicated by the voltage across the current sensing resistor 154. The microprocessor then commands the current regulator 150 over the lead 158 to turn off the FET 152 for a predetermined interval. With the FET 152 turned off, current in the coil 24' will circulate through the fly-back diode 156. The rate of the decay of the current in this loop will be dependent upon the resistance of the coil 24' and its inductance.

As mentioned, the difference in the inductance between when the armature (not shown) is seated on the core (not shown), and therefore, the contacts M2,M3,M4 are closed, and when there is a gap between the armature and the core, and therefore, the contacts are open, is significantly greater than the difference between the hot and cold resistance of the coil 24'. Thus, the impedance of the coil 24' is dominated by the inductance and therefore the change in the inductance will be reflected in the rate of decay of the current. The current is measured again at the conclusion of a predetermined time period which is less than the interval for which the current regulator 150 is turned off. In the exemplary embodiment of the invention, this time period is one open cold coil time constant. If the coil 24' is closed, whether it is hot or cold, the coil current will be greater than 50% of the initial current. If the coil 24' is open, then the current will be less than about 33% of the initial current. Thus, the measure of current is an indication of the position of the contacts M2,M3,M4. This technique will not result in drop out of the closed contacts, because the holding current is typically twice the current needed to prevent drop out of the armature. Typically, if the contacts are closed, then the current will only decay to about 87% of its initial value within the one open cold time constant of the coil 24'. Thus, through resumption of the application of closing current to the coil 24' following the second measurement, closed contacts will remain closed.

Figure 7:
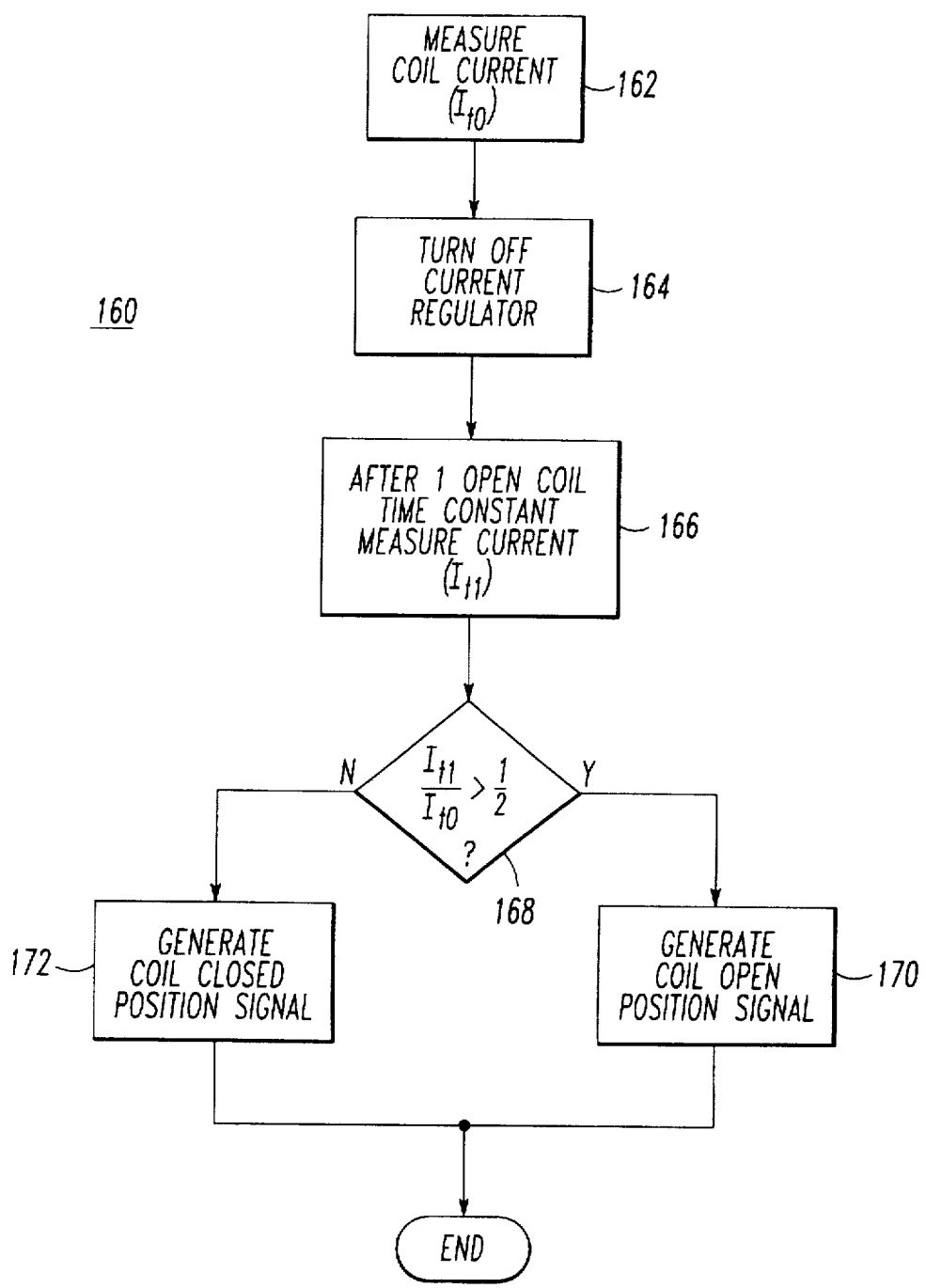
FIG. 7 is a flowchart of a routine used in the implementation of the embodiment of FIG. 6.

FIG. 7 is a flowchart of a suitable routine 160 used by the microprocessor of integrated circuit U1 to determine the position of the contacts M2,M3,M4 in a switch having the DC coil 24' in the manner discussed above. First, an initial value of coil current, $I_{t0}$, is measured at step 162. The current regulator 150 is then turned off at step 164. After one open cold time constant of the coil 24', a second measurement of coil current, $I_{t1}$, is measured at step 166. If the second value of the current, $I_{t1}$, is more than 50% of the initial value of the current, $I_{t0}$, as determined at step 168, then the microprocessor generates the closed state of the operating signal O at step 170 to indicate that the coil 24' is closed and, otherwise, generates the open state of the operating signal O at step 172.

It will be appreciated by those skilled in the art that other methods of generating the operating signal O are possible such as, for example, generating the operating signal O: (1) from the trip signal T of FIG. 2 without providing feedback to the circuit 79 of FIG. 3; (2) from the circuit 126 to the routine 70 of FIG. 5; (3) from the current regulator 150 to the routine 160 of FIGS. 6–7; (4) by monitoring the physical position of the separable contacts M2,M3,M4; (5) by monitoring the voltage or current applied to the motor 14; or (6) by employing auxiliary contacts with the contactor 66. For example, if monitoring the current applied to a running motor, then the motor current always at least includes a non-zero magnetic current (e.g., typically about greater than or equal to 30% of rated motor current) even if there is no load.

Although exemplary digital 10' and analog 10" circuits are disclosed herein, it will be appreciated by those skilled in the art that other equivalent analog and/or digital circuit solutions are possible.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A motor starter for an electrical circuit including a power source and a load, said motor starter comprising:
    separable contact means for switching an electrical current flowing between said power source and said load;
    operating means responsive to a trip signal for opening and closing said separable contact means;
    means for providing an operating signal having a first state when said separable contact means is open and a second state when said separable contact means is closed;
    means for sensing the electrical current flowing between said power source and said load and providing a sensed current value therefrom; and
    overload relay means for generating the trip signal as a function of the sensed current value time and the two states of the operating signal, said overload relay means comprising:
        means for increasing a thermal protection signal as a function of the sensed current value;
        means for changing the thermal protection signal as a function of a first time constant in the event of the first state of the operating signal;
        means for alternatively changing the thermal protection signal as a function of a second time constant in the event of the second state of the operating signal;
        means for comparing the thermal protection signal with a predetermined signal; and
        means generating the trip signal when the thermal protection signal is about greater than the predetermined signal.

2. The motor starter as recited in claim 1 wherein said overload relay means includes means for generating the trip signal as an $I^2t$ function of the sensed current value.

3. The motor starter as recited in claim 2 wherein said means for generating the trip signal as an $I^2t$ function of the sensed current value includes an analog circuit.

4. The motor starter as recited in claim 3 wherein said overload relay means further includes processor means; and wherein said means for generating the trip signal as an $I^2t$ function of the sensed current value is a routine executed by said processor means.

5. A motor starter for an electrical circuit including a power source and a load, said motor starter comprising:
    separable contact means for switching an electrical current flowing between said power source and said load;
    operating means responsive to a trip signal for opening and closing said separable contact means;
    means for providing an operating signal having a first state when said separable contact means is open and a second state when said separable contact means is closed;
    means for sensing the electrical current flowing between said power source and said load and providing a sensed current value therefrom; and
    overload relay means for generating the trip signal as a function of the sensed current value, time and the two states of the operating signal, said overload relay means comprising:
        means for generating a squared current as a function of the square of the sensed current value;
        capacitor means for charging by the squared current of said means for generating a squared current, said capacitor means having a thermal protection voltage thereacross;
        first resistor means for discharging said capacitor means;
        second resistor means;
        switch means for switching said second resistor means in parallel with said first resistor means in response to the second state of the operating signal when said separable contact means is closed; and
        means generating the trip signal when the thermal protection voltage is about greater than a predetermined voltage.

6. A motor starter for an electrical circuit including a power source and a load, said motor starter comprising:
    electrical contactor means including separable contact means for switching an electrical current flowing between said power source and said load, and operating means responsive to a trip signal for opening and closing said separable contact means;
    means for providing an operating signal having a first state when said separable contact means is open and a second state when said separable contact means is closed;
    means for sensing the electrical current flowing between said power source and said load and providing a sensed current value therefrom; and
    overload relay means for generating the trip signal as a function of the sensed current value and the two states of the operating signal, said overload relay means comprising:
        means for increasing a thermal protection signal as a function of the sensed current value;
        means for decreasing the thermal protection signal as a function of a first time constant in the event of the first state of the operating signal;
        means for alternatively decreasing the thermal protection signal as a function of a second time constant in the event of the second state of the operating signal;
        means for comparing the thermal protection signal with a predetermined signal; and
        means generating the trip signal when the thermal protection signal is about greater than the predetermined signal.

7. The motor starter as recited in claim 6 wherein said overload relay means for generating the trip signal includes a microcontroller.

8. The motor starter as recited in claim 6 wherein said overload relay means for generating the trip signal includes a digital circuit.

9. The motor starter as recited in claim 6 wherein said overload relay means for generating the trip signal includes an analog circuit.

10. An electrical switching apparatus for an electrical circuit including a power source and a load, said electrical switching apparatus comprising:
    separable contact means for switching an electrical current flowing between said power source and said load, said separable contact means having a closed position and an open position;
    means responsive to a trip signal for moving said separable contact means from the closed position to the open position;
    means for providing an operating signal having a first state when said separable contact means is open and a second state when said separable contact means is closed;
    means for sensing the electrical current flowing between said power source and said load and providing a sensed current value therefrom; and
    means for generating the trip signal as a function of the sensed current value and the two states of the operating signal, said means for generating the trip signal comprising:
        means for increasing a thermal protection signal as a function of the sensed current value;
        means for decreasing the thermal protection signal as a function of a first time constant in the event of the first state of the operating signal;
        means for alternatively decreasing the thermal protection signal as a function of a second time constant in the event of the second state of the operating signal; and
        means generating the trip signal when the thermal protection signal is about greater than a predetermined signal.

11. The electrical switching apparatus as recited in claim 10 wherein said means for generating the trip signal includes a processor means.

12. The electrical switching apparatus as recited in claim 10 wherein said means for generating the trip signal includes a digital circuit.

13. The electrical switching apparatus as recited in claim 10 wherein said means for generating the trip signal includes an analog circuit.

14. An electrical switching apparatus for an electrical circuit including a power source and a load, said electrical switching apparatus comprising:
    separable contact means for switching an electrical current flowing between said power source and said load, said separable contact means having a closed position and an open position;
    means responsive to a trip signal for moving said separable contact means from the closed position to the open position;

means for providing an operating signal having a first state when said separable contact means is open and a second state when said separable contact means is closed;

means for sensing the electrical current flowing between said power source and said load and providing a sensed current value therefrom; and means for generating the trip signal as a function of the sensed current value and the two states of the operating signal, wherein said means responsive to a trip signal comprises:
  coil means for moving said separable contact means, said coil means having a first inductance when said separable contact means is closed and a second inductance when said separable contact means is open, and
  energizing means for energizing said coil means with coil current in order to close said separable contact means; and wherein said means for providing an operating signal comprises:
  means for monitoring the coil current, and
  means generating the operating signal as a function of said coil current as affected by said first inductance and by said second inductance.

15. The electrical switching apparatus as recited in claim 14 wherein said coil means is an alternating current (AC) coil; wherein said energizing means applies an AC voltage to said AC coil; wherein said means for monitoring the coil current includes means for measuring the coil current to provide a measured value; and wherein said means generating the operating signal includes:

means for comparing the measured value to a threshold value, means for generating the first state of the operating signal when said separable contact means is open and the measured value is about less than said threshold value, and means for generating the second state of the operating signal when said separable contact means is closed and the measured value is about greater than said threshold value.

* * * * *